United States Patent [19]

Schinasi et al.

[11] Patent Number: 5,709,477
[45] Date of Patent: Jan. 20, 1998

[54] DEVICE FOR THE GATHERING AND/OR TRANSPORT OF GARDEN REFUSE OR PRODUCTS OF SIMILAR CHARACTERISTICS

[75] Inventors: Piero Schinasi; Madeleine Schinasi, both of Epalinges, Switzerland

[73] Assignee: Codefine S.A., Lausanne, Switzerland

[21] Appl. No.: 498,929

[22] Filed: Jul. 6, 1995

[30] Foreign Application Priority Data

Jul. 8, 1994 [CH] Switzerland ............... 02191/94

[51] Int. Cl.⁶ .................................................. B65D 33/06
[52] U.S. Cl. ................... 383/4; 15/257.6; 280/19; 383/16; 383/67
[58] Field of Search ............... 383/4, 127, 67, 383/6, 16; 280/19; 15/257.1, 257.6

[56] References Cited

U.S. PATENT DOCUMENTS

| | | | |
|---|---|---|---|
| 2,502,486 | 4/1950 | Savrin | 383/4 |
| 2,974,971 | 3/1961 | Buck. | |
| 3,312,263 | 4/1967 | Wahlstrom. | |
| 3,355,187 | 11/1967 | Brindle. | |
| 4,173,351 | 11/1979 | Hetland. | |
| 4,224,970 | 9/1980 | Williamson et al. | 383/117 |
| 4,471,600 | 9/1984 | Dunleavy | 383/127 |
| 4,542,050 | 9/1985 | Gallant | 383/4 |
| 4,955,925 | 9/1990 | Platti. | |
| 5,104,133 | 4/1992 | Reiner. | |

FOREIGN PATENT DOCUMENTS

| | | | |
|---|---|---|---|
| 1804423 | 5/1970 | Germany | 15/257.1 |
| 5130910 | 5/1993 | Japan | 383/4 |
| 2097244 | 11/1982 | United Kingdom | 383/4 |
| 2153195 | 8/1985 | United Kingdom. | |
| WO 94/06666 | 3/1994 | WIPO. | |

*Primary Examiner*—Stephen P. Garbe
*Attorney, Agent, or Firm*—Woodard, Emhardt, Naughton, Moriarty & McNett

[57] ABSTRACT

A device for the collection and transport of garden refuse, consisting of a lower piece (2), made for preference of a sliding material, in such a way that its two faces which are capable of sliding present a low coefficient of friction, the device thus resembling a bag, in such a way that the lower piece (2) comprises a broad sheet (7) capable of being folded back onto the bag in such a way as to bring together the handling grips (8 and 9). The device not only allows or garden refuse to be collected and moved, by dragging it like a sled, but likewise allows for the bag to be closed on itself in such a way as to allow or clean and practical transport of the refuse.

4 Claims, 5 Drawing Sheets

5,709,477

DEVICE FOR THE GATHERING AND/OR TRANSPORT OF GARDEN REFUSE OR PRODUCTS OF SIMILAR CHARACTERISTICS

TECHNICAL FIELD

This invention relates to a device for the gathering and/or transport of garden refuse or of products with similar characteristics.

BACKGROUND OF THE INVENTION

The gathering of garden refuse such as dead leaves, small branches, fir cones, grass cuttings, etc. is a task well known to both professional gardeners and to week-end gardeners.

Whether this involves the maintenance of a private garden, a public park, or a golf course for example, the method of clearance is basically the same. In effect, the gardener cleans a certain area of his lawn by using a garden rake or broom. In public parks or on golf courses use is made of tractors fitted with a blower device, the jet of air from which blows the refuse clear.

Whatever the means used or the scale of the work, the refuse will in each case finally be gathered together in a heap which requires transportation in order for the refuse to be deposited on a compost heap or conveyed to a place at which it can be burned.

For transporting the refuse, use may be made of rigid containers, in the form of plastic or metal buckets, but such containers are impractical for at least two reasons. In the first place it is difficult to move trolleys or containers equipped with wheels over surfaces such as lawns, since on the one hand the lawns may be marked by the movement of these devices, and, on the other, such surfaces offer resistance to rolling. In the second place, garden refuse in general features a large volume for low weight, in such a way that it can be frustrating to find that weight of the container is, in the final analysis, greater than that of the contents, and that the efforts made to manoeuvre the containers are largely valueless.

For these reasons, it has been suggested that use be made for the gathering and movement of garden refuse of devices which essentially feature two common characteristics; in the first place, they are made of a flexible material such as fabric, and, in the second place, they allow for movement by sliding on the surface of the lawn, employing a sliding motion comparable to that of a sled.

An initial solution proposed by the state of the art consists of using a piece of square fabric, the corners of which are provided with eyelets, the heap of refuse being piled up in the centre of this square surface, and the four corners of the material then being brought together to form a kind of bag. Such a proposal is disclosed in the international patent application published under number WO 94106666.

Deriving from the same idea, it has likewise been proposed that eyelets be provided on the borders of the piece of material in such a way as a cord can be introduced through them which will simultaneously allow for the device to be dragged, while enclosing it on itself, at least in part. This proposal is disclosed in U.S. Pat. No. 5,104,103.

This latter arrangement presents a disadvantage to the extent that it would seem likely that the surface of the material would include raised edging along the sides in such a way as to form a kind of trough rather than a simple flat surface. This applies in particular when the task involves moving the device along an inclined piece of ground, in which case the refuse may be entirely displaced outside the device. In order to rectify this disadvantage, it has likewise been proposed, particularly in U.S. Pat. No. 3,355,187, that one of the sides of the material be reinforced by hems, in which rods may be inserted in order to keep the structure rigid. In this way the device comprises, at least in the area adjacent to the side fitted with the rigidity rods, lateral edging, the device overall having a shape which recalls the hull of a boat.

With the same end in view, the device illustrated in U.S. Pat. No. 2,974,971 proposes the use of a peripheral hem running along three sides of the surface of the material, a hem in which a cord is fitted which, once extended, is intended to raise the edges of the material and create lateral walls, which allow the heap of refuse to be contained, which will plainly tend to spread out as has already been described.

One advantage common to all the devices referred to above is that, when the gardener places them in a flat position, in other words without applying a device which will allow for lateral edging to be created, it is possible to load the refuse onto the material by raking it or by pushing the refuse towards its centre. The various devices according to the prior state of the art certainly allow for a pile of refuse to be dragged from one point to another on the surface of the lawn but these devices are impractical in respect of disposing of the refuse and not simply of moving it on the ground by causing the device to slide like a sled.

In addition to this, weekend gardeners are in general required to move their garden refuse to a location provided for that purpose. Most of them use their own vehicles to transport garden refuse, and it is difficult for them, or even impossible, to load a rigid container of useful size into their vehicle.

SUMMARY OF THE INVENTION

The aim of this invention is to propose a device for the gathering and/or transport of garden refuse or of products of similar characteristics, which features the same advantages as the devices previously known; i.e. of being able to be drawn across the ground like a sled, and to be made of a flexible material such as fabric, but which likewise features the advantage of being able to be closed up in such a way as to form a bag which could be easily transported, particularly by means of a vehicle.

The device for the gathering and/or transport of garden refuse or of products with similar characteristics according to the invention comprises a lower piece, made of a flexible but not extendible material, this piece being intended to slide on the ground, wherein apart from the lower piece, it comprises two lateral pieces, an upper piece, and a base piece, said lateral, upper and base pieces being of material similar to that of the first piece and being joined to one another by their adjacent edges in such a way as to form a bag.

BRIEF DESCRIPTION OF THE DRAWINGS

Two embodiments of the device according to the invention are described below by way of example, making reference to the drawing, in which.

DESCRIPTION OF THE PREFERRED EMBODIMENTS

Before starting a description of the figures it is appropriate to point out that the material used to create the device is referred to hereinunder as fabric. Fabric is undoubtedly the material best suited for the creation of the device, but this by no means implies that other materials, particularly synthetics or plastic material, would not be suitable. On the contrary, such materials may well feature advantages, in particular in respect of a compromise between the rigidity and flexibility required, a compromise which varies depending on the applications of the device, and according to the dimensions in which it is manufactured. Accordingly, the term "fabric" is to be understood hereinafter as any material of which the properties are appropriate to create the device and to attain the aim of the invention.

Figure 1:
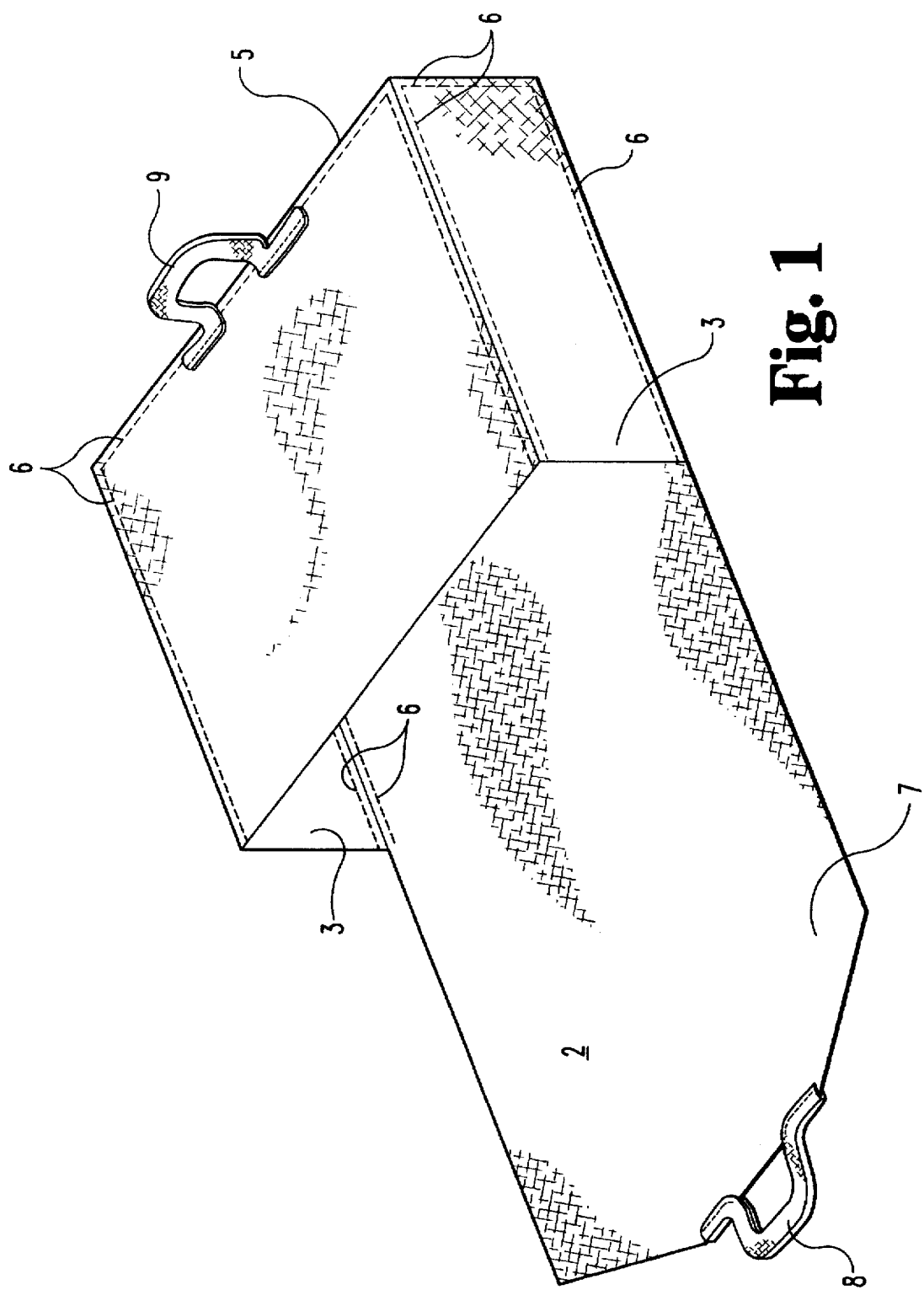
FIG. 1 is a schematic perspective view of the device for the gathering and/or transport of garden refuse of products of similar characteristics, according to the first embodiment.
Figure 2:
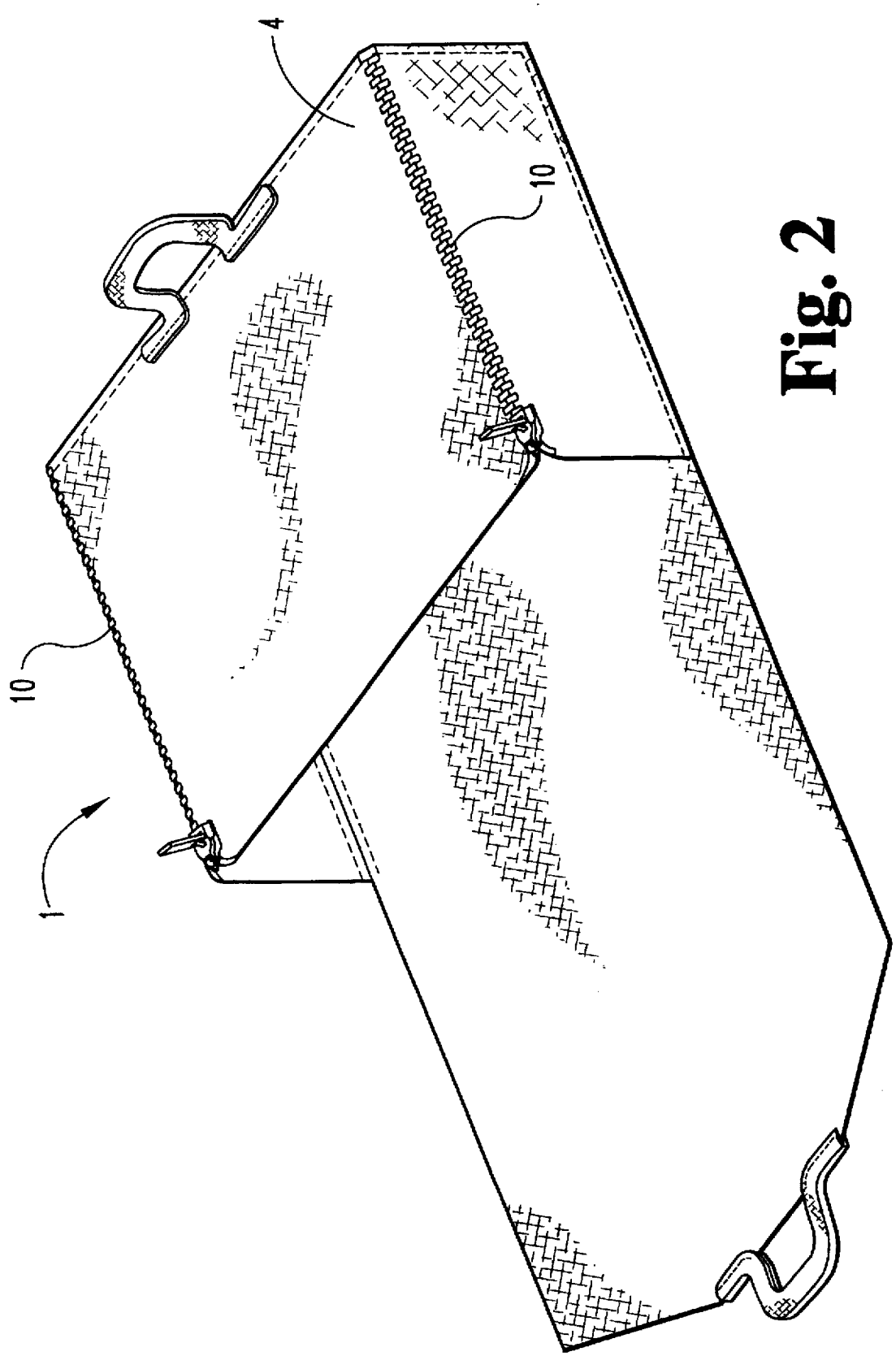
FIG. 2 is a schematic perspective view of device according to the second embodiment.

In FIG. 1, it can be seen that the device 1 is composed of a lower piece 2 of fabric which will rest on the ground when the device is deployed in its operating position. Likewise, two pieces of lateral fabric 3 can be seen, which form the sides of the device; an upper piece 4, likewise of fabric, and finally the base 5 of the device, likewise consisting of a piece of fabric, but not shown in FIG. 1. FIG. 1, as well as FIG. 2, show the device in schematic form since, although the fabric used is particularly resistant, and thus has a certain rigidity or consistence, it is clear that a device consisting of pieces of fabric cannot maintain in itself a configuration as rigid and geometrical as that shown in FIGS. 1 and 2. Nevertheless, for the understanding of the invention, it has been deemed preferable to illustrate the device and its variations in this manner.

The various pieces which constitute the device are assembled, for example by way of seams 6. The seams are for preference arranged on the interior of the device, not only for aesthetic reasons but, above all, to emphasise there rigidity.

The lower piece of fabric 2 plays a different part to that of the other pieces of which the device is composed. In effect, this lower piece 2 will be simultaneously in contact with the ground and with the pile of garden refuse which can be accumulated on the foldable section 7 of the lower piece 2. The fabric used for the lower piece 2 will, for preference, be chosen in such a way as to provide a sliding surface. On the one hand, this is in order that the face turned towards the ground slides on the grass, and so that the device can be dragged, for example by pulling it by means of a grip 8. On the other hand, when the pile of refuse has been accumulated on the foldable part 7, it is likewise of advantage for the upper surface of the piece 2 to be likewise capable of sliding in such a way as to favour the pile of refuse sliding towards the interior of the device.

As far as the four other pieces of fabric 3, 4, and 5 are concerned, which form the device, recourse can be made for preference to a courser fabric which, while still being flexible, can nonetheless have a certain rigidity which will contribute to maintaining the device in a semi open position.

Thanks to the fact that the device is comprised of several pieces, it is possible to prepare these pieces from different fabrics, more or less heavy and resistant. A device intended for private gardening could be made in whole or in part of a lighter fabric than a device which would be chosen for more robust usage, which is the case when the device should, for example, be drawn by a vehicle.

Accordingly, the lower part, which is subjected to the greatest stress both with regard to tractive force and friction, could be made of a woven and laminated polypropylene fabric of 230 grams per square meter. This same fabric can also be used to form the lateral pieces 3 and the base 5. In turn, it would be perfectly possible to use a fabric of woven laminated polypropylene of 100 grams per square meter to form the upper piece 4.

The use of lighter fabric will undoubtedly contribute to reducing the cost of manufacture of the device. The data enumerated above are examples given to define certain concepts, but by no means constitute either upper or lower limitations.

The traction grips 8 and 9 can be created by means of strips of fabric, the ends of which are stitched to the pieces of the device in such a way that the middle of the strip forms a handle.

It is important to point out that the device is formed in such a way that when it is drawn on the ground like a sled, the tractive force is applied solely to the fabric, via the handle. In return, no other element, such as a cord, need be applied. This tractive force applied by the fabric itself constitutes a considerable advantage in relation to the known solutions, on the one hand due to its simplicity the device being capable of being drawn as it is, and, on the other hand, because the stresses are distributed, and the device can be dragged without appreciable deformation.

As far as the dimensions of each of the pieces of the device are concerned, it is appropriate to point out at the outset that, provided a coherent relationship is maintained between the dimensions of the pieces in relation to one another, there is absolute freedom in choosing the dimensions which are appropriate for the use of the device in a specific context, the important factor being that the device has the attributes of a bag. An example may be given of the dimensions which offer a satisfactory compromise between the internal volume of the bag and the ease with which it can be used. The total length of the lower piece 2 can be selected at 280 cm and its width at 120 cm. The lateral pieces 3 have a length of 120 cm and a height of 50 cm, which is likewise the case with the base piece 5 of the device. In all situations with the example given, the upper piece 4 of the device will be formed from a square piece measuring 120 cm by 120 cm.

The upper part of the device and its base, i.e. the lateral pieces 3, the upper piece 4, and the base 5, can likewise be made of a single piece of fabric, pre-cut in such a way as not to have any seams except between the side walls 3 and the lower piece 2, as well as between the lower edge of the base 5 and the lower piece 2. However, the presence of angled seams 6 is likewise of such a nature as to lend a certain rigidity to the device, this effect being precisely researched in order to facilitate its use.

In FIG. 2, which illustrates the second variation of the device according to the invention, the device is shown with its constituent elements, the references of which are not given. In relation to the variation in FIG. 1, the difference lies in the fact that at least one of the upper longitudinal edges of the device is provided with a zip fastener 10. If, as illustrated in FIG. 2, provision is made for a zip fastener 10 on each of the upper longitudinal edges of the device, it is possible, by opening the fasteners, to fold back the whole of the upper piece 4 of the fabric in such a way as to facilitate the emptying of the device. The two zip fasteners 10 may equally well be extended along the length of the two edges which make up the joint between the base 5 and the lateral pieces 3.

Figure 5:
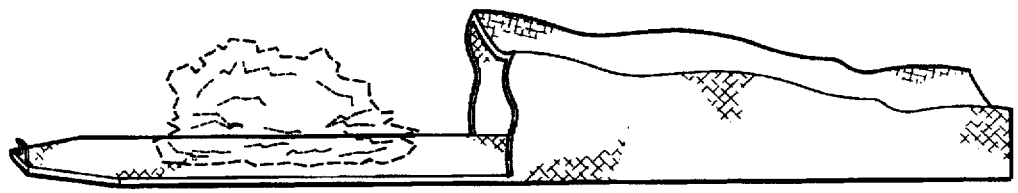
FIGS. 5 and 6 illustrate a second method of loading, then of filling the device according to the first and/or second embodiment of the invention.
Figure 6:
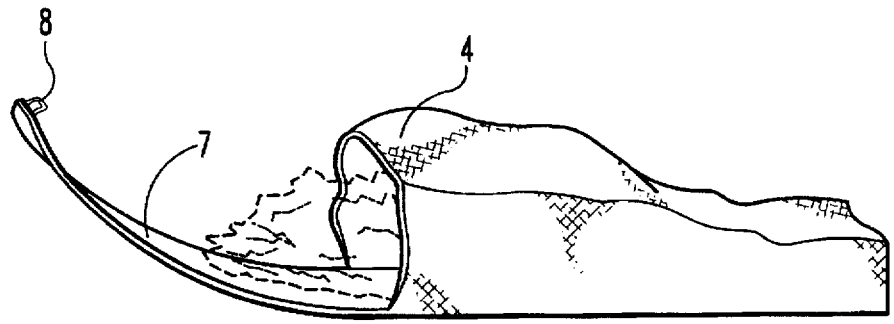

In FIG. 5, it can be seen that a heap of garden refuse may he piled on the foldable section 7 by means of the grip 8, which can be grasped in one hand. With the other hand, it is possible to raise the edge of the upper piece 4 in order to open the mouth of the bag, and to allow the heap of refuse to slide into the interior. Depending on the dimension which have been chosen, one single person can carry out this operation, which, as has been pointed out, is facilitated by the fact that the surface of the lower piece 2 is capable of sliding on its two sides, and, as a consequence, the heap of refuse will tend to slide quite naturally into the interior of the bag.

If devices of large dimensions are employed, it is only the distance separating the edge of the upper piece 4 from the grip 8 which prevents one single person from carrying out the manoeuvre in one operation. The gardener can, however, begin by raising the lower piece 2 by means of the grip 8 in such a way as to bring the larger part of the heap of refuse into the immediate proximity of the mouth of the bag; he will then raise the upper part 4, and push the heap of refuse towards the interior, by hand or with the aid of a garden broom. Once part of the heap of refuse has been introduced into the interior of the mouth of the bag, and if this is then kept open, it will be sufficient to raise the foldable part 7 once again, by means of the grip 8, in order for the whole of the heap of refuse to slide into the interior of the device.

Figure 7:
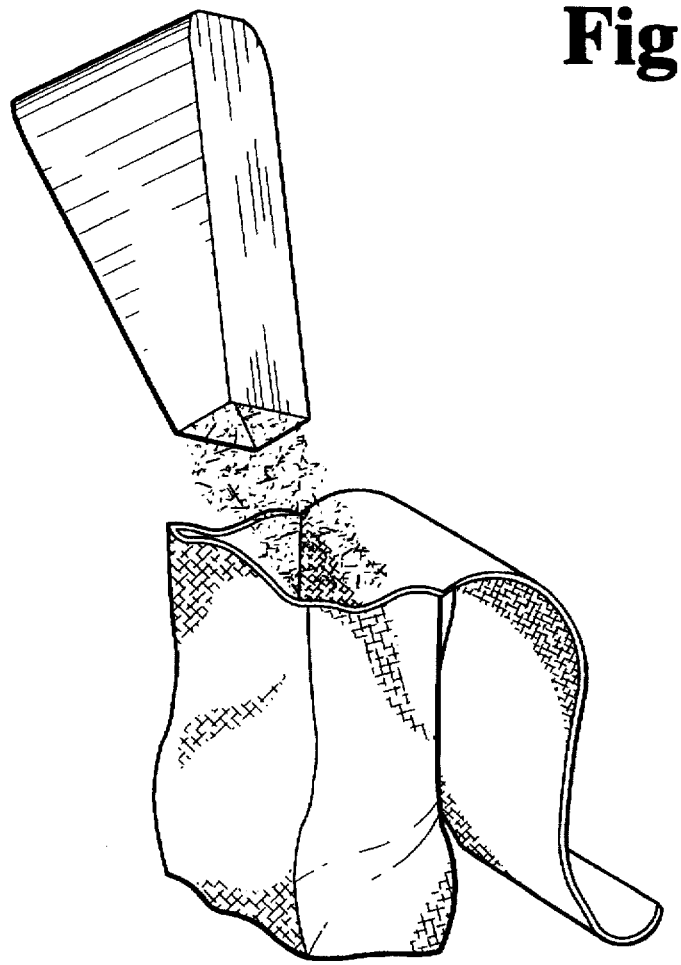
FIG. 7 illustrates a method of filling the device according to the first and/or second embodiments of the invention.

It can be seen in FIG. 7 that the device does, to some degree, remain upright by itself. In effect, thanks to the rigidity of the fabric, accentuated by the seams forming the sharp edges of the device, it is sufficient for the device to contain a certain mass of refuse in order for it to sit on its base, and the device itself has a tendency itself to remain open. This particular feature makes a major contribution towards emptying the collector bin of a lawn mower, as shown in FIG. 7.

Figure 4:
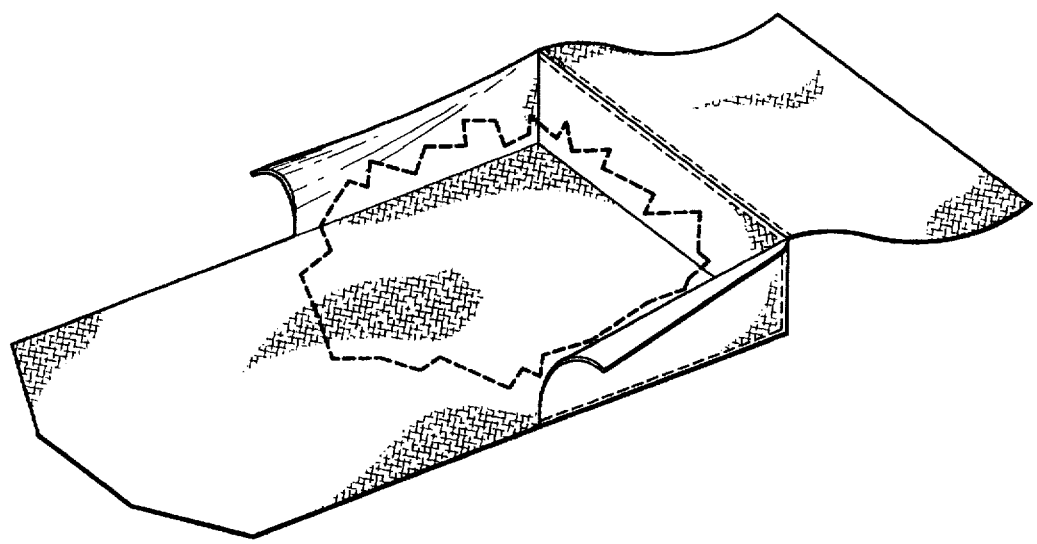
FIG. 4 illustrates an initial method of loading the device according to the second embodiment of the invention.

In FIG. 4, which relates to the second embodiment, it can be seen that, thanks to the zip fasteners, the upper piece of the device can be folded back in such a way as to facilitate filling, while still retaining a certain vertical structure in the two lateral pieces and the base.

Figure 3:
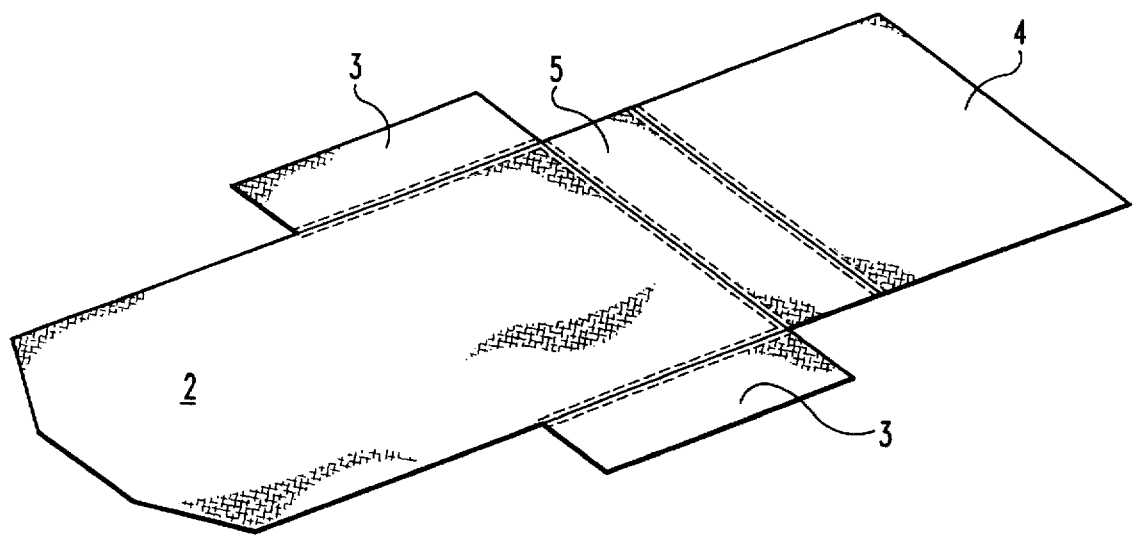
FIG. 3 is a perspective view of an example of a device according to the second embodiment of the invention, illustrated in its fully deployed position.

In FIG. 3, which relates to the same embodiment as FIG. 4, the fasteners are entirely open, which allows for the device to be fully deployed in such a way that its pieces rest on the ground. This configuration can be used, for example, if all that is involved is the movement of a pile of refuse from one place to another on the same lawn, without real transport as such.

Figure 8:
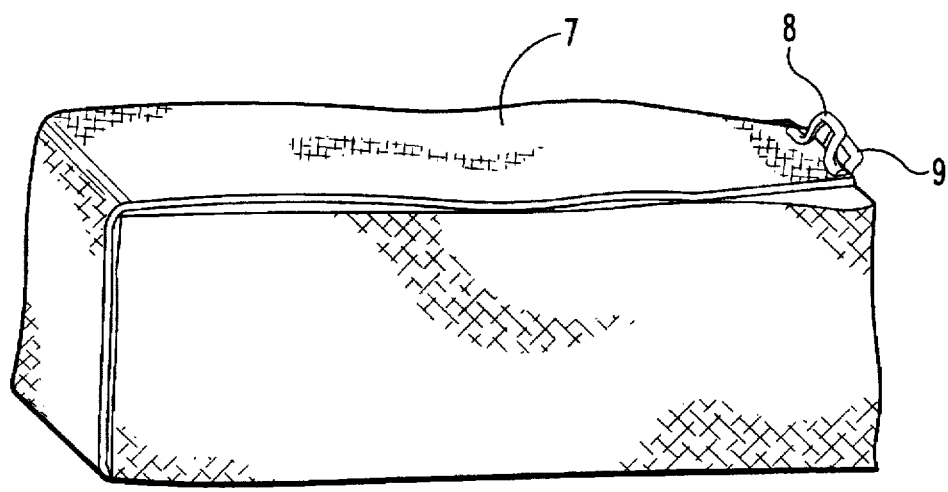
FIGS. 8 and 9 show perspective views of the device once it has been closed.

In FIG. 8, it can be seen that the foldable part 7 has been folded above the upper part 4, and that the two grips 8 and 9 have been brought together. FIG. 8 illustrates one of the reasons for which the total length of the lower piece 2 is chosen for preference to correspond to twice the length of the side pieces, plus the height of the said side pieces. In this configuration, the gardener is able to grasp both the grips 8 and 9, and to drag the device over the soil, while being assured that its contents will not escape. In fact, the length of the lower piece 2 is slightly less as a result of the method of calculation indicated above, this being such that it is necessary to exert a certain amount of traction on the grip 8 in order to bring it together with the grip 9, a force which is of value to bring the lower piece 2 against the mouth of the bag and to close it.

Figure 9:
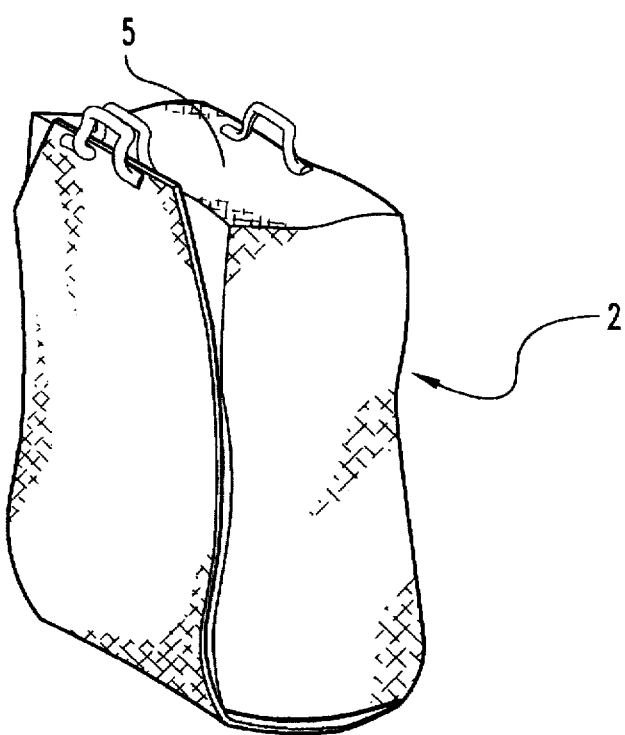

Finally, in FIG. 9, it can be seen that the device, once filled, and presenting exactly the configuration illustrated in FIG. 8, can be raised into the vertical position. Provision is likewise made for the seam marking the join between the base 5 and the lower piece 2 of a grip similar to the two grips already mentioned. In this way, the device can be seen as a type of case, which can be handled and loaded, for example, into the boot of a car.

Depending on the dimensions which have been chosen for manufacturing the device, it may be useful to make provision for other grips than those illustrated, for example in FIGS. 8 and 9, and particularly for grips which can be sewn onto each of the two seams connecting the base 5 of the device to the two lateral pieces 3. In a general sense, however, it is not intended that a grip be provided on the lower surface of the lower piece 2, so as not to impede, the sliding of the device on the ground.

As has been pointed out above, the device according to the invention features the many advantages associated with devices already proposed according to the prior state of the art. This involves, in particular, an extremely low cost of manufacture. In effect, the materials used, such as the fabric or other material featuring the same properties, are readily available and cheap. Moreover, the few sewing operations necessary for the device to be assembled are likewise procedures which are well known, and for which entirely adequate equipment already exists.

In relation to the devices proposed by the prior state of the art, the device according to the invention likewise features an advantage, which consists of the fact that only the lower piece 2 of the device need for preference be manufactured in a fabric of which the surface possesses sliding qualities. The configuration proposed for the device according to the invention allows for a fabric of another type to be used for the other pieces of the device, which may of lower cost. The device according to the invention features the advantage of being able to be slid easily on the ground, particularly on a lawn; this was indeed the case with the devices according to the prior state of the art, with the difference that the tractive effect was exerted by the fabric itself. The device according to the invention, however, features the advantage of being able to be hauled not only in an open position, but likewise in the closed position.

The device according to the invention features the unique advantage of allowing for clean and practical transport of garden refuse. In particular, the configuration of the device according to the invention allows it to be rapidly loaded onto a vehicle, and, since the device is then closed on itself, the risk of seeing part of the contents of the device escaping into the inside of the vehicle is kept to an absolute minimum, in particular if the device is loaded in such a way that its base rests on the loading surface.

Another advantage of the device according to the invention is that, thanks in particular to the fact that the grips can be arranged on the seams of the base of the device, it is extremely easy for the device to be emptied. This is particularly true with regard to die second embodiment, shown in FIG. 2, since, thanks to the zip fasteners, it is possible to empty the contents of the device entirely. It is also appropriate to note that, for the emptying operation, the fact that the upper face of the lower piece 2 is likewise capable of sliding, thus also allowing for easier emptying of the device.

Finally, the device according to the invention can be used as packaging for the transport and sale of products with similar properties to those of garden refuse. Peat, for example, can be wrapped in the device according to the invention, and the product thus marketed, offering the purchaser a form of packing which he can use as described above, rather than throwing the packaging away or destroying it. Use as packaging or wrapping can plainly be applied to a large number of products and is not limited to peat.

We claim:

1. A device for the gathering and/or transport of garden refuse or of products of similar characteristics, comprising a lower piece, made of a flexible but not extendible material, that lies in substantially a single plane when fully extended on the ground, this piece being intended to slide on the ground, wherein apart from the lower piece, it comprises two lateral pieces, an upper piece, and a base piece, the lateral, upper and base pieces being of material similar to that of the lower piece and being joined to one another by their adjacent edges in such a way as to form a bag; wherein said two lateral pieces and said upper piece are of the same length, and the lower piece is of a length which is greater than twice the lengths of said lateral and upper pieces, wherein the base piece has grips secured in the center portion of both of its transverse sides and a third grip is secured in the center portion of the side of the lower piece that is opposed to the base piece.

2. A device for the gathering and/or transport of garden refuse or of products of similar characteristics, comprising a lower piece, made of a flexible but not extendible material, this piece being intended to slide on the ground, wherein apart from the lower piece, it comprises two lateral pieces, an upper piece, and a base piece, the lateral, upper and base pieces being of material similar to that of the lower piece and being joined to one another by their adjacent edges in such a way as to form a bag, at least two of the pieces of the device are made of materials which differ at least in their weight per square meter.

3. A device for the gathering and/or transport of garden refuse or of products of similar characteristics, comprising a lower piece, made of a flexible but not extendible material, this piece being intended to slide on the ground, wherein apart from the lower piece, it comprises two lateral pieces, an upper piece, and a base piece, the lateral, upper and base pieces being of material similar to that of the lower piece and being joined to one another by their adjacent edges in such a way as to form a bag; the two lateral pieces and the upper piece having the same length, said length defining the depth of the bag, and the lower piece having a total length which is greater than the double of the depth of the bag, wherein at least one of the pieces of the device is made of a laminated woven polypropylene fabric of a weight greater than 100 grams per square meter; and wherein at least two of the pieces of the device are made of materials which differ at least in their weight per square meter.

4. A device for the gathering and/or transport of garden refuse or of products of similar characteristics, comprising a lower piece, made of a flexible but not extendible material, this piece being intended to slide on the ground, wherein apart from the lower piece, it comprises two lateral pieces, an upper piece, and a base piece, the lateral, upper and base pieces being of material similar to that of the lower piece and being joined to one another by their adjacent edges in such a way as to form a bag; the two lateral pieces and the upper piece having the same length, said length defining the depth of the bag, and the lower piece having a total length which is greater than the double of the depth of the bag, wherein at least two pieces with adjacent edges are joined by a zip fastener secured on one side to one of the pieces, and, on the other, to the other piece and wherein the upper piece is provided with two zip fasteners, namely one along each of its longitudinal edges.

* * * * *